(12) United States Patent
Babington et al.

(10) Patent No.: US 9,822,982 B2
(45) Date of Patent: Nov. 21, 2017

(54) MODULAR PORTABLE COOKING SYSTEM

(71) Applicant: Babington Technology LLC, Rocky Mount, NC (US)

(72) Inventors: Robert S. Babington, McLean, VA (US); Ramiro Andrade, Spring Hope, NC (US); Andrew D. Babington, Potomac Falls, VA (US)

(73) Assignee: BABINGTON TECHNOLOGY, LLC, Rocky Mount, NC (US)

( * ) Notice: Subject to any disclaimer, the term of this patent is extended or adjusted under 35 U.S.C. 154(b) by 63 days.

(21) Appl. No.: 14/838,925

(22) Filed: Aug. 28, 2015

(65) Prior Publication Data

US 2016/0061455 A1    Mar. 3, 2016

Related U.S. Application Data

(60) Provisional application No. 62/043,439, filed on Aug. 29, 2014.

(51) Int. Cl.
| | |
|---|---|
| A47J 37/07 | (2006.01) |
| F24C 3/14 | (2006.01) |
| A47J 36/34 | (2006.01) |
| F24C 1/16 | (2006.01) |
| F24C 15/30 | (2006.01) |

(52) U.S. Cl.
CPC .............. *F24C 3/14* (2013.01); *A47J 36/34* (2013.01); *F24C 1/16* (2013.01); *F24C 15/30* (2013.01)

(58) Field of Classification Search
CPC ... F24C 3/14; F24C 15/30; A47J 36/00; A47J 36/34

USPC ........ 99/339, 340, 403, 422; 126/4, 5, 25 R, 126/39 G, 268, 299 D
See application file for complete search history.

(56) References Cited

U.S. PATENT DOCUMENTS

| | | | | |
|---|---|---|---|---|
| 1,736,223 | A  * | 11/1929 | Silen ...................... | A47J 37/01 99/339 |
| 2,594,938 | A  * | 4/1952 | Leavitt ..................... | E03C 1/18 4/626 |
| 2,907,316 | A  * | 10/1959 | Windust .................... | F24C 1/16 126/24 |
| 2006/0016348 | A1 | 1/2006 | Babington | |
| 2012/0318256 | A1 * | 12/2012 | Chilton .................. | F24C 15/18 126/39 H |
| 2014/0311356 | A1 * | 10/2014 | Daniels ............... | A47J 37/0713 99/340 |

* cited by examiner

*Primary Examiner* — Thien S Tran
(74) *Attorney, Agent, or Firm* — Polsinelli PC

(57) ABSTRACT

A modular cooking apparatus is provided. A base unit is configured to direct heat to a recess, the recess having a ledge therein configured to receive a stockpot. A griddle has a top griddle cooking surface, and a downward extending wall configured to engage the recess of the base unit. An oven has a substantially open bottom, and is configured to engage the top griddle cooking surface of the griddle, where the griddle cooking surface acts as the heat source for the oven. The base unit individually defines a stockpot cooker configuration, a combination of the griddle mounted on the base unit defines a griddle configuration, and a combination of the griddle mounted on the base unit and the oven mounted on the griddle defines an oven configuration.

18 Claims, 22 Drawing Sheets

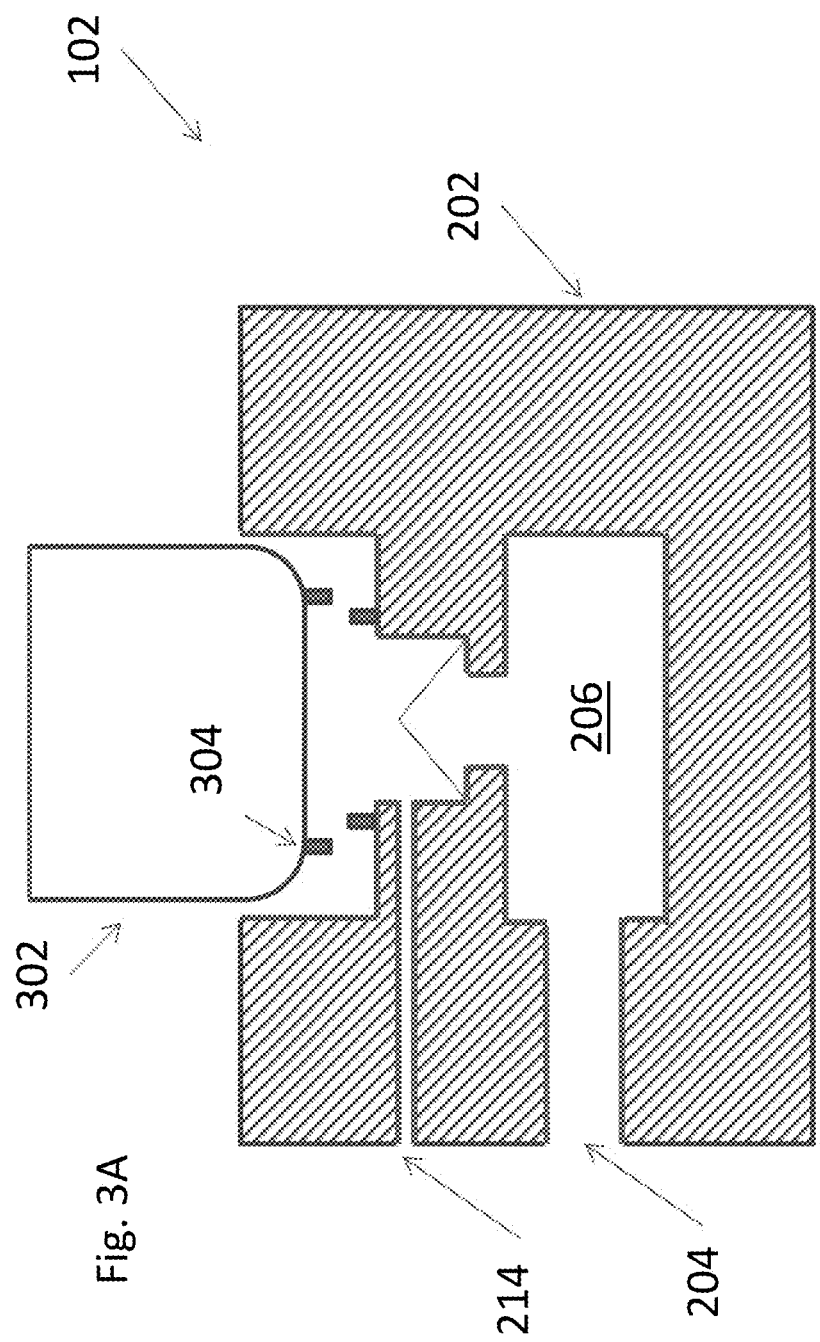

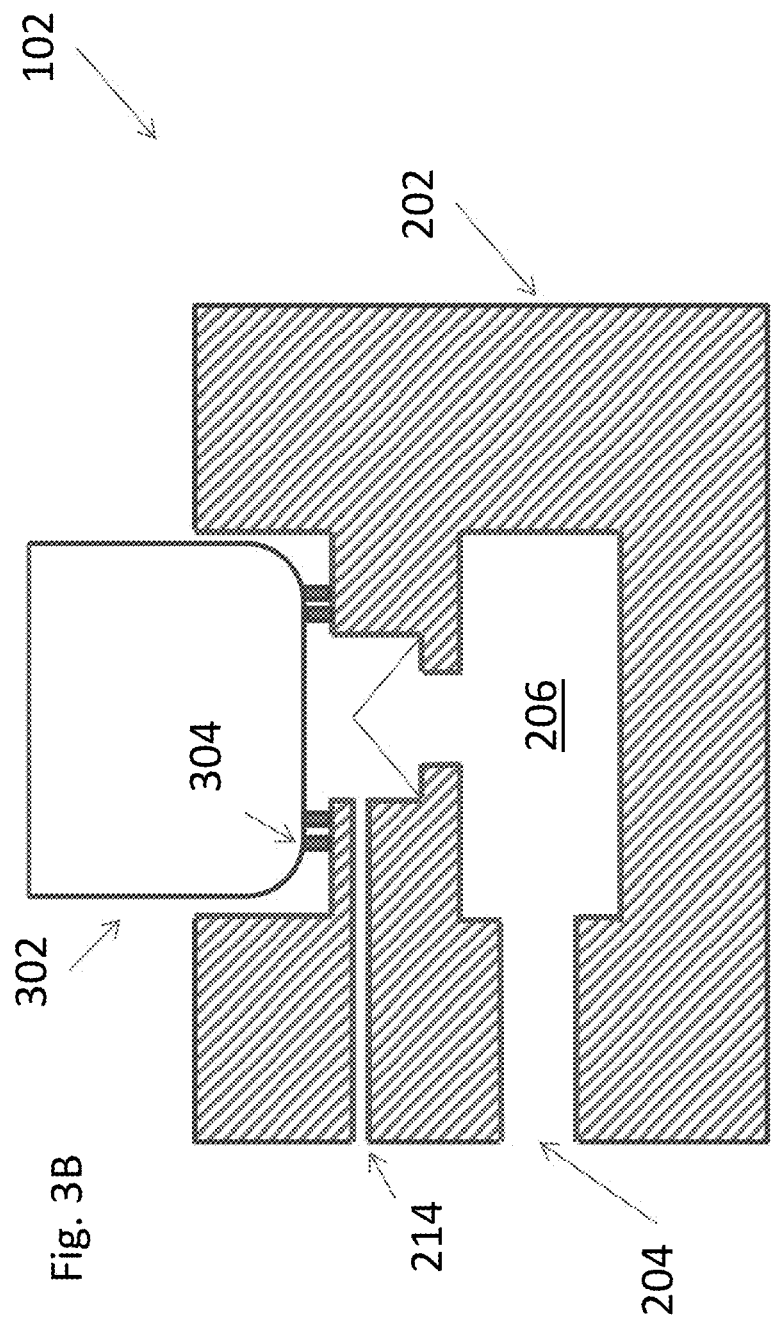

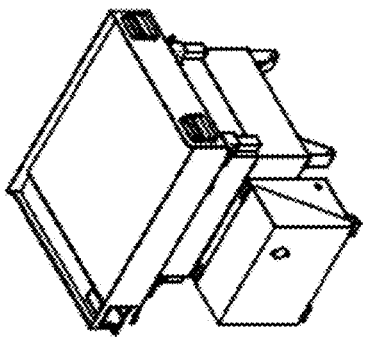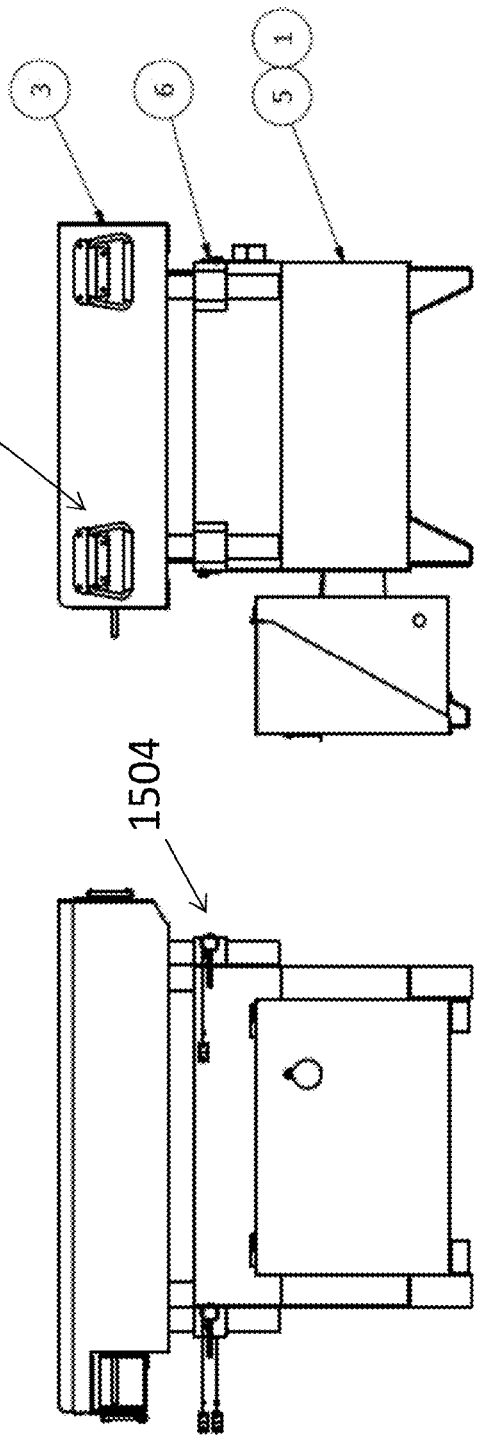
Fig. 15

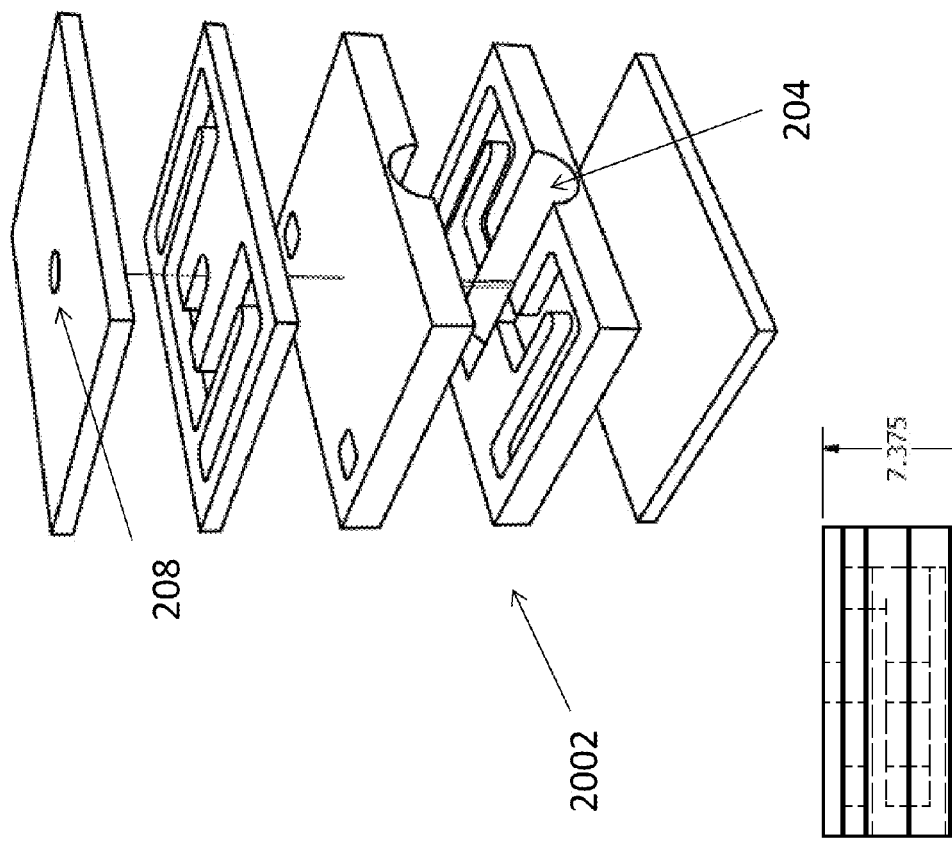
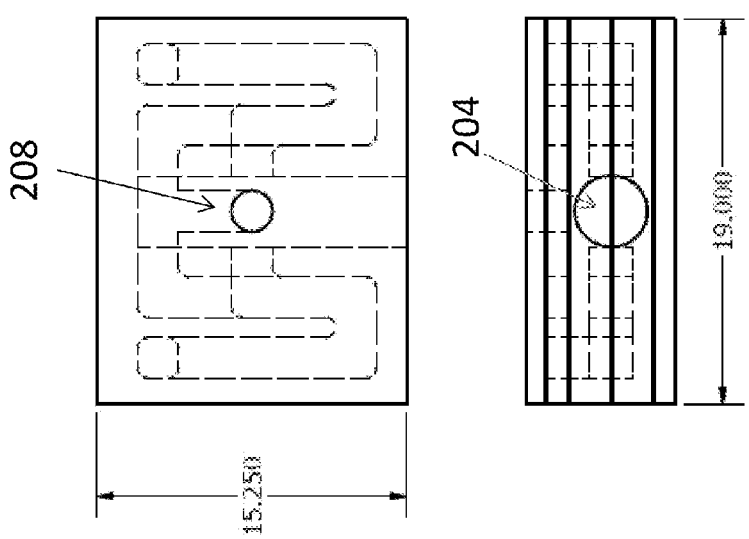
Fig. 20

MODULAR PORTABLE COOKING SYSTEM

This application claims the benefit of U.S. Provisional Application No. 62/043,439, filed Aug. 29, 2015, the entire contents of all are hereby incorporated by reference.

FIELD OF THE INVENTION

The various embodiments described herein relate generally to portable kitchen appliances. More particularly, the embodiments relate to modular kitchen appliances that can be stacked to provide different types of cooking environments.

BACKGROUND

It is often necessary to cook for significant numbers of people at locations that do not have access to working kitchen facilities. For example, disaster relief operations need transportable kitchen appliances to bring to disaster zones and relief centers. Military units need kitchen appliances to support operations as personnel are deployed and relocate base camp. Restaurants and caterers may wish to cook at remote locations, such as beaches, wooded areas, street fairs, etc. A need therefore exists for portable and/or mobile kitchen appliances.

A difficulty with portable and/or mobile kitchen appliances is that it can be difficult to obtain different types of fuel in such circumstances. For example, if the transporting vehicle runs on gasoline and the cooking appliances run off propane, then there is a need to store, transport and maintain a supply of two different fuels. Gasoline and propane are also volatile fuels and dangerous to transport and store in the field. Organizations that provide such services therefore prefer that kitchen appliances and the vehicles that transport them consume the same type of fuel. Liquid distillate fuel, such as diesel, is preferred.

One such system for meeting the above needs is a mobile kitchen trailer, such as shown in U.S. Pat. No. 8,499,755 entitled Mobile Kitchen, the contents of which are incorporated by reference herein in its entirety. Such a mobile kitchen is an enclosed trailer that includes distinct kitchen appliances, such as a stockpot cooker, a griddle, a convection oven, a refrigerator, a tray ration heater, a heated sink, and a sanitation unit. An organization can simply attach the trailer to a vehicle, and use the same type of fuel to drive the kitchen to the desired location and fuel the kitchen appliances.

While the aforementioned mobile kitchen is an effective tool, its size, footprint and cost may limit the number that can be deployed and the locations to which it can be deployed. The enclosed trailer environment for the kitchen also presents heat and noise concerns that require specialized systems to compensate for.

BRIEF DESCRIPTION OF THE DRAWINGS

Various embodiments in accordance with the present disclosure will be described with reference to the drawings, in which:

FIGS. 3A and 3B illustrate a cross section side view of a stockpot cooker with a stockpot deployed in a stockpot cooker configuration according to an embodiment of the invention.

FIG. 15 illustrates another embodiment of a griddle configuration.

FIG. 20 illustrates another embodiment of a firebox.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Figure 1:
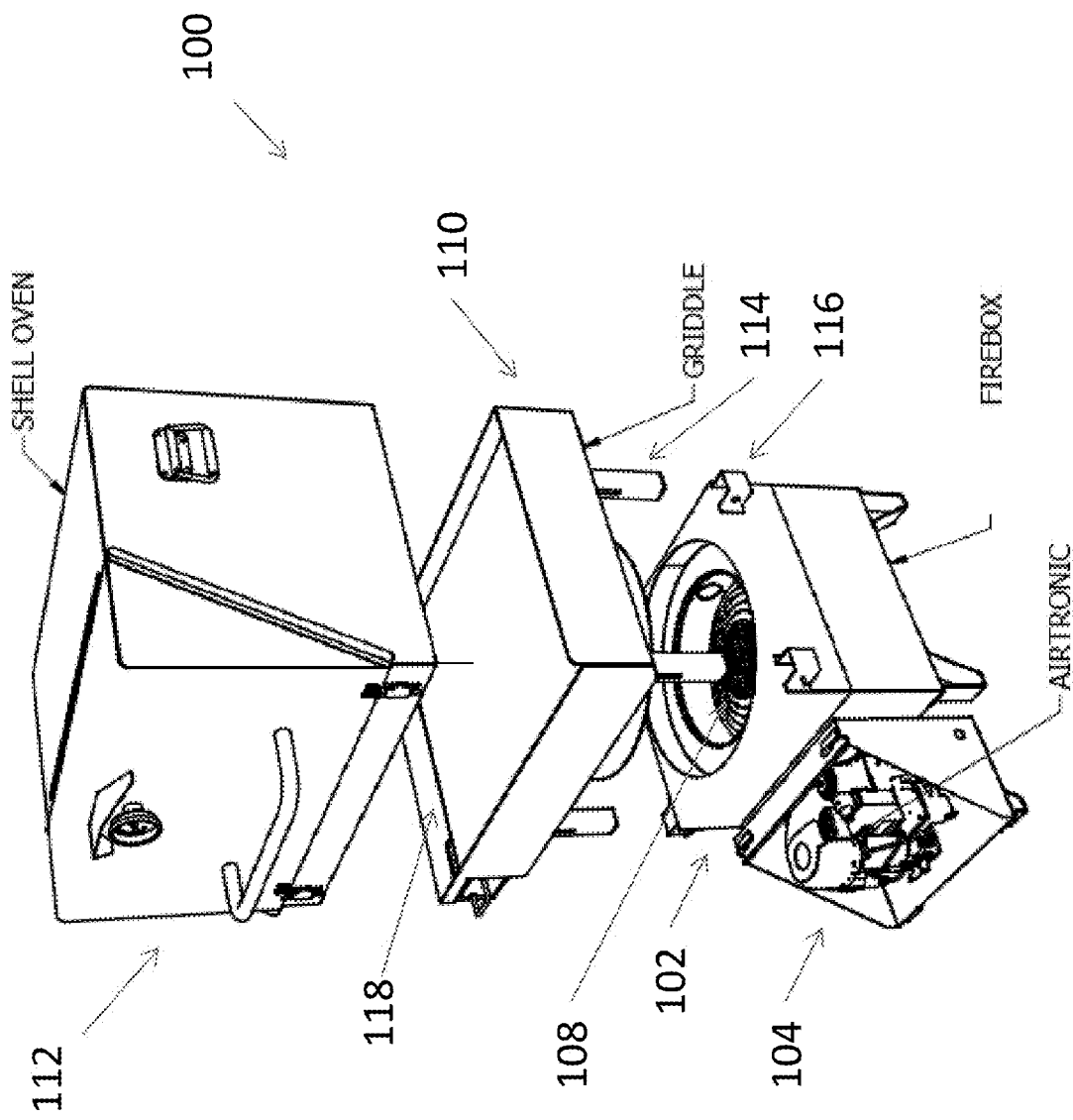
FIG. 1 illustrates a perspective view of an embodiment of a modular cooking apparatus.
Figure 2:
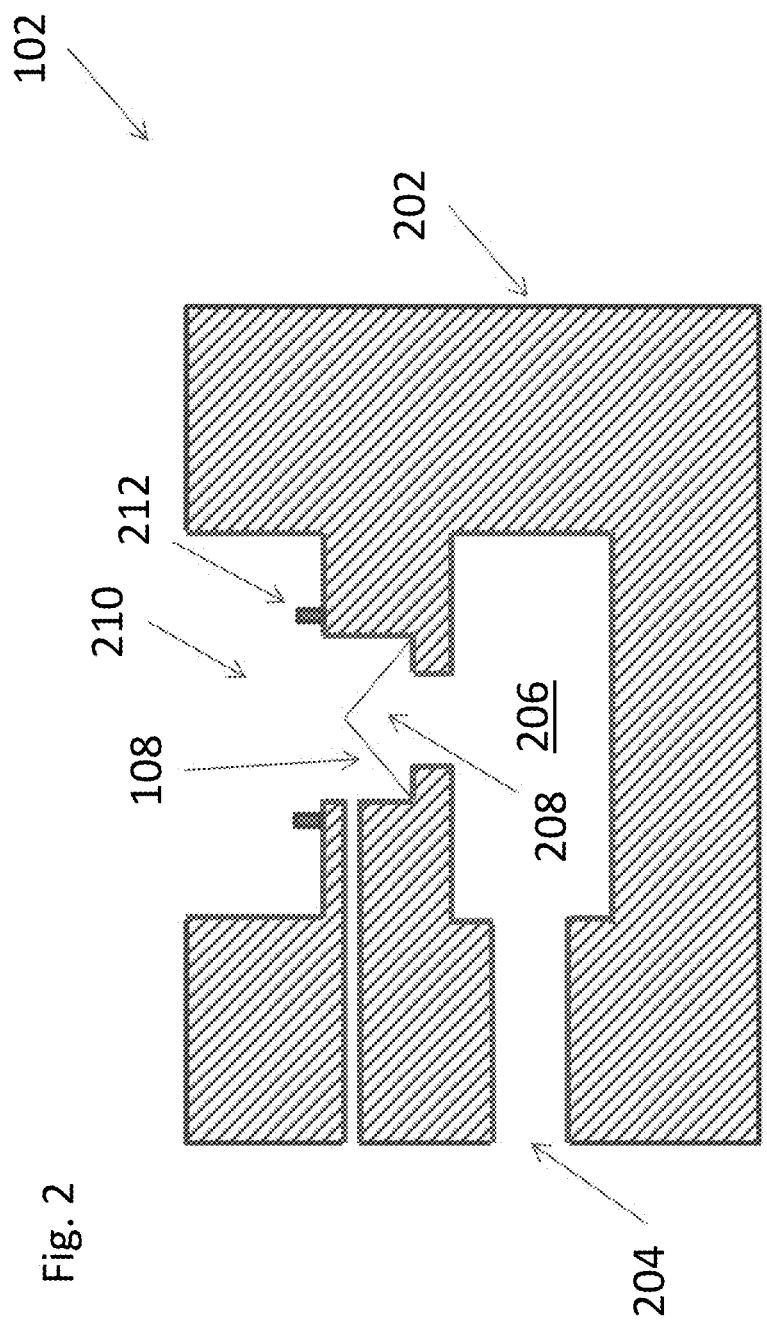
FIG. 2 illustrates a cross section side view of a stockpot cooker according to an embodiment of the invention.

Referring now to FIGS. 1 and 2, a modular system 100 includes as a base a stockpot cooker 102. A burner 104 burns fuel, preferably liquid distillate fuel, and directs the combustion over the fuel into the interior of stockpot cooker 102. Stockpot cooker 102 directs the heat upward to a dispersion barrier 108 that will provide heat to the different cooking components above it. A griddle 110 may be mounted above the stockpot cooker to provide a griddle surface or act as a base for other cooking components. An oven may be mounted above the griddle. Burner 104 is shown at the front of stockpot cooker 102, but may be connected to any side, and preferably the rear side of stockpot cooker 102.

The stockpot cooker 102 may be as shown in U.S. Patent Publication 2010/0011971 entitled STOCKPOT COOKER, the contents of which are incorporated herein by reference in its entirety. For ease of discussion the embodiments herein will be described with respect to that design, although it is to be understood that other designs could also be used.

Burner 104 may be any burner that burns fuel at sufficient heat to heat stockpot cooker 102. By way of non-limiting example, the AIRTRONIC series of burners by BABINGTON TECHNOLOGY are suitable for this task. In a related non-limiting example, U.S. Pat. No. 4,298,338 entitled LIQUID FUEL BURNERS or U.S. Pat. No. 8,622,737 entitled PERFORATED FLAME TUBE FOR A LIQUID FUEL BURNER, the contents of which are incorporated herein by reference in their entireties, may be used. The invention is not limited to a particular type of burner. Different types of burners may be interchangeable with each other for use with the same stockpot cooker 102 to provide attachment versatility and/or variations in size or fuel type.

Referring now to FIG. 2, stockpot cooker 102 includes a firebox 202 constructed from a low heat transfer and non-combustible material; such materials are well known to those skilled in the relevant art and not discussed further herein. Firebox 202 includes a burner receptacle 204 that connects to burner 104 (not shown in FIG. 2) to receive combusting fuel from burner 104 and direct it into a chamber 206. A duct 208 carries the heat upward from chamber 206 towards dispersion barrier 108 that rests on an outer ledge of duct 208. Duct 208 continues upward into a recess 210 configured to receive or couple with a stockpot or other mating cooking appliance as discussed below.

Figure 19:
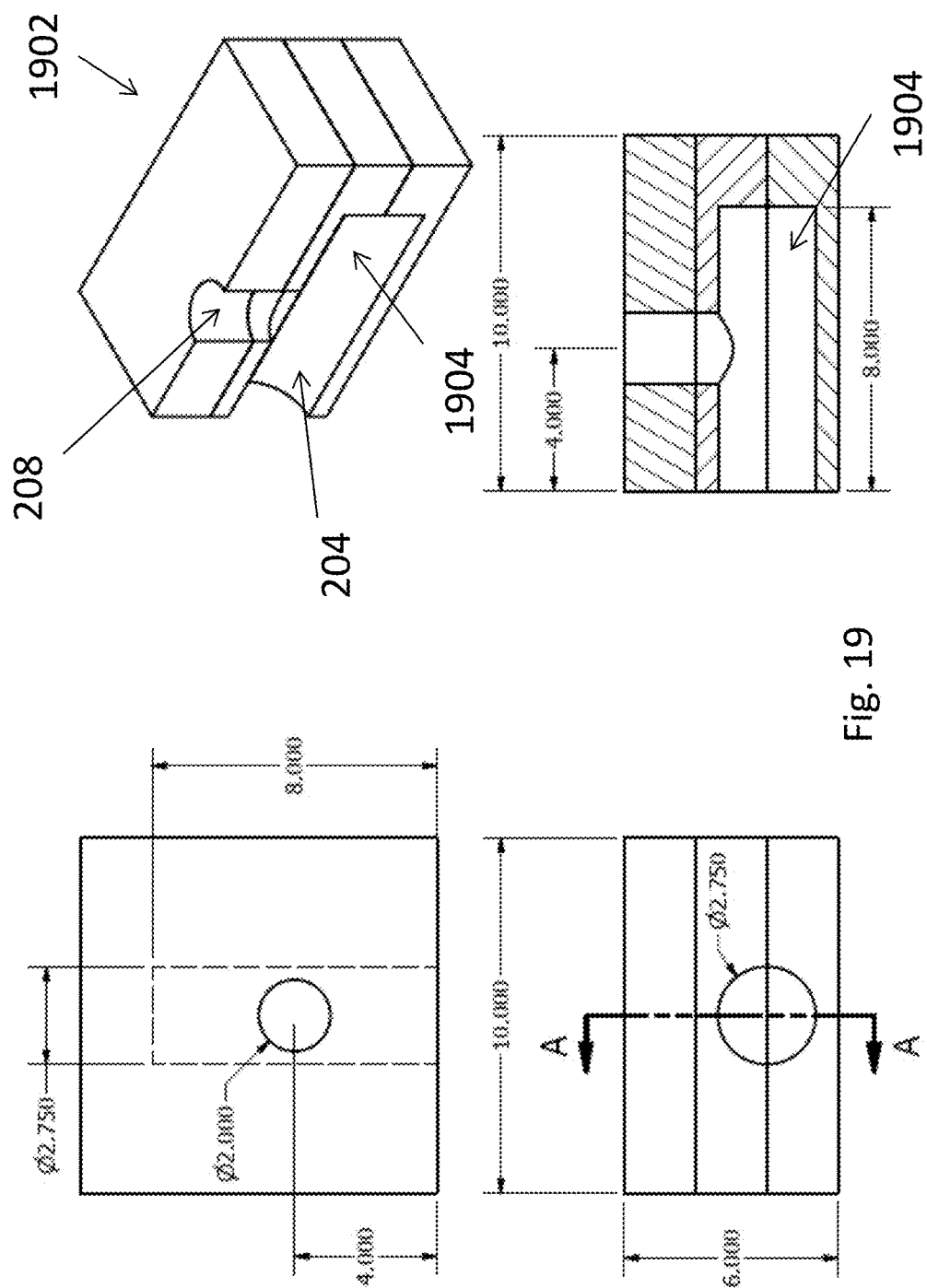
FIG. 19 illustrates another embodiment of a firebox.

Other firebox configurations could also be used. By way of non-limiting example, as shown in FIG. 19, firebox 1902 has an elongated rear area 1904, which induces a reduction in noise and/or a blue flame as compared to prior art stockpot cookers. In another example in FIG. 20, firebox 2002 also redirects the heat internally through a series of pathways that substantially reduce noise and/or produce a bluer flame.

An inserted stockpot could rest directly on the ledge at the base of recess 210. In the alternative, a circular ring 212 may extend upward from the base of recess 210, and any stockpot or cooking appliance lowered into recess 210 would rest on ring 212.

Additional temperature sensors and controls may be added to stockpot cooker 102 and/or burner 104 as desired to control the heat output. Such sensors and controls are familiar to those skilled in the art, and as such are not detailed further herein.

Referring now to FIGS. 3A and 3B, stockpot cooker 102 is shown with a stockpot 302 there above. Stockpot 302 may have a downwardly extending ring 304 that may be generally coaxial with ring 212 within the recess 210 of stockpot cooker 102. Stockpot 302 may be laid into recess 210 such that it rests on ring 212 and its lower extending ring 304 contacts the base of recess 210. In this configuration, heat rises directly from chamber 206 through duct 208 to the base of stockpot 302, and excess heat and/or exhaust gases vent out through a vent 214.

This configuration of ring 212 along with ring 304, if present, creates a lateral heat shield barrier such that heat rising through duct 208 cannot easily escape through the bottom and sides of stockpot 302. Rather, heat would have to go up above ring 212 and then beneath ring 304, which is a more difficult pathway for the heat to traverse than if the bottom of stockpot 302 was resting directly on the base of recess 210. In the figures ring 304 has a larger diameter than ring 212, although this need not be the case as ring 212 could have the larger diameter. Nor are ring 300 and/or ring 212 limited to circular structures, and other structures (e.g., a hexagon) could be used. Ring 300 and ring 212 may be coaxial and abutting, or have a distance there between (which would be concentric but generally not be a coaxial relationship absent coincidence or the provision of some other type of guidance structure, such as stockpot cooker 302 and the same outer dimension as the dimension of recess 210).

Figure 4:
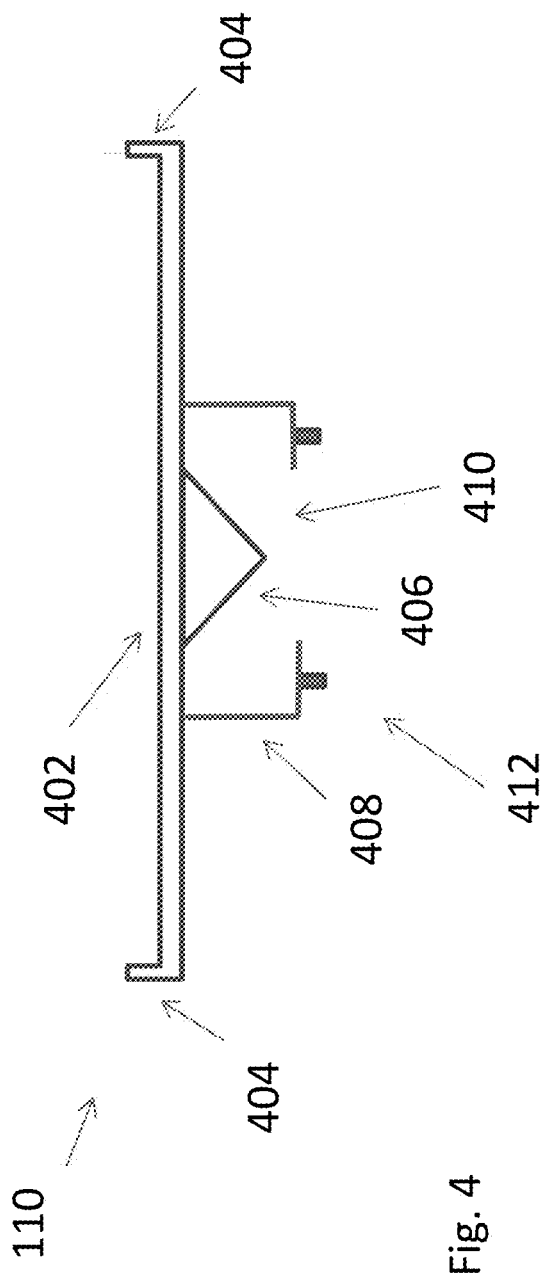
FIG. 4 illustrates a cross section side view of a griddle according to an embodiment of the invention.

Referring now to FIGS. 1 and 4, the modular unit 100 can be converted to a griddle by mounting griddle 110 on top of stockpot cooker 102. As best seen in FIG. 1, griddle 110 may have downwardly extending legs 114 that slide into supports 116 that extend laterally from stockpot cooker 102; legs 114 may extend to the bottom of stockpot cooker 102 such that griddle 110 supports its own weight, or may be shorter such that stockpot cooker 102 bears the weight of griddle 110. Pins and complementary slots or the like may be provided in legs 114 and/or supports 116 to secure legs 114 in place, although other securing methodologies could be used and the invention is not limited to any particular such methodology. Proper placement of the legs/supports allows griddle 110 to be wider/larger than the top surface area of stockpot cooker 102.

Griddle 110 may include aspects of the griddle in U.S. Patent Publication 2006/0016348 entitled GRIDDLE TOP FOR PORTABLE FIELD FEEDING, the disclosure of which is incorporated herein by reference in its entirety. Griddle 110 includes a flat top griddle surface 402 upon which foods can be cooked, such as pancakes. Flanges 404 around the perimeter of griddle surface 402 keep food and/or grease from falling off of griddle surface 402; as discussed below, flanges 404 may also brace other cooking appliances mounted on top of griddle 110.

A diverging mass 406, which may be in the shape of an inverse pyramid, is welded to the bottom of griddle 110 within heating cavity 410; diverting mass 406 diverts rising heat from firebox 202 laterally across the bottom surface of griddle 110; this provides an even cooking temperature across griddle surface 402, and physically stabilizes griddle 110 to prevent warping in the center due to the extreme heat.

Figure 5:
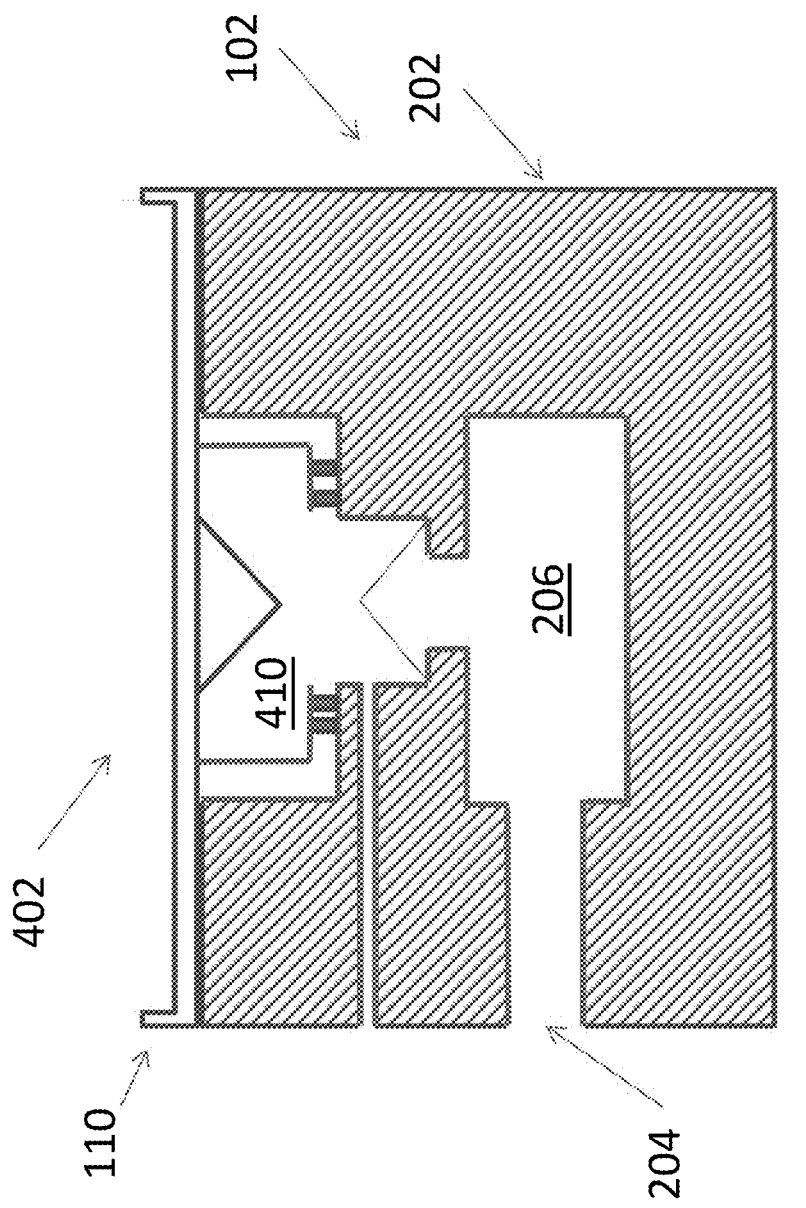
FIG. 5 illustrates a cross section side view of a griddle and stockpot cooker deployed in a griddle configuration according to an embodiment of the invention.

Referring now also to FIG. 5, a cylindrical wall 408 extends from the bottom of griddle 110 around diverging mass 406, and has an at least partially open bottom to define a heating cavity 410. When griddle 110 is lowered onto stockpot cooker 102, the cylindrical wall 408 rests on the ledge of recess 210. The bottom of cylindrical wall 408 may include a ring (similar to ring 304) that engages with ring 212 (if present) to limit the flow of heat as described above.

Once mounted, heat generated within fire box 202 rises through duct 208 into heating chamber 410. Deflection mass 406 will deflect the incoming upward heat laterally along the bottom of griddle 110; the circular wall 408 may at least initially limit the lateral heat flow but this will even out across griddle surface 402 shortly after activation. This creates an evenly heated griddle surface 402 for griddle cooking The lack of a direct heat pathway from fire box 206 to the outside air above (ventilation is generally limited laterally to vent 214) substantially reduces the noise emitted by stockpot cooker 202 when griddle 110 is placed thereon.

Figure 6:
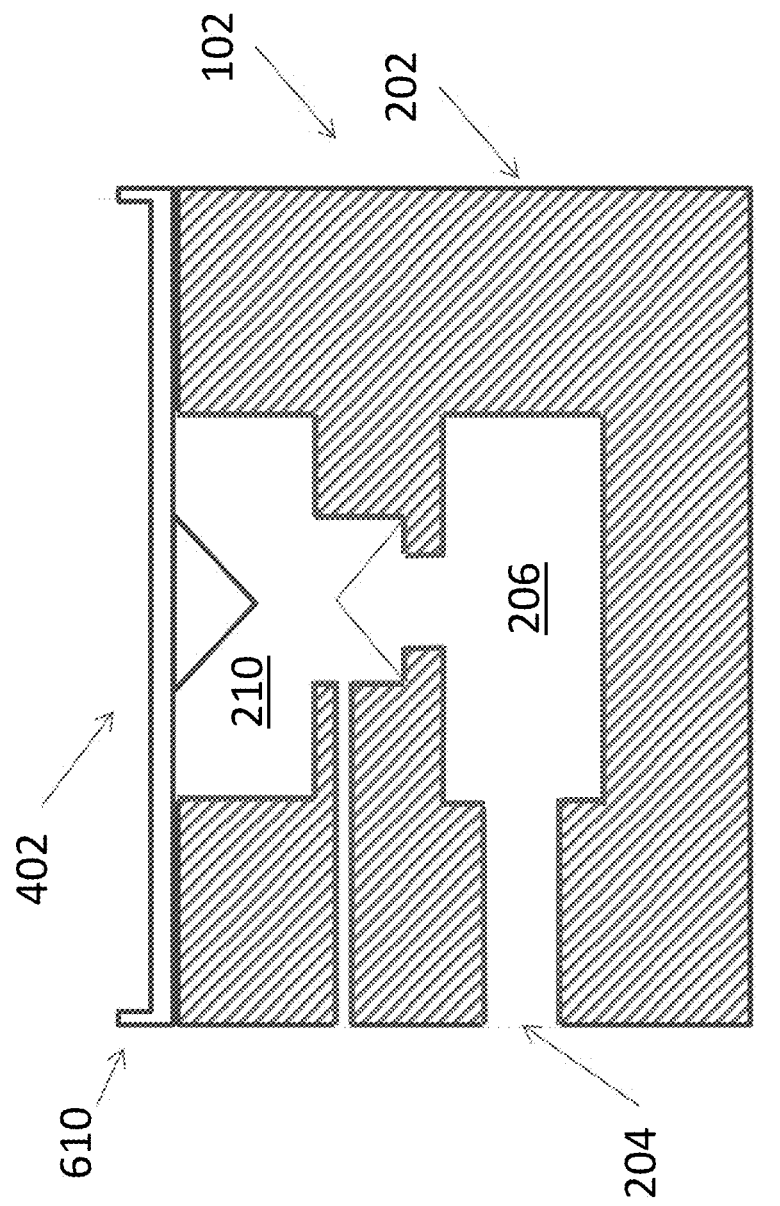
FIG. 6 illustrates a cross section side view of a griddle and stockpot cooker according to another embodiment of the invention.

Referring now to FIG. 6, another embodiment of a griddle 610 is shown. In this embodiment, circular wall 408 is omitted. The underside of griddle 610 sits on the top of stockpot cooker 102 to seal the top of recess 210; recess 210 thus defines a heating chamber. Heat from fire box 206 will rise into this heating chamber, where it will be deflected by deflection mass 206 to heat the entire grill surface 402.

Figure 7:
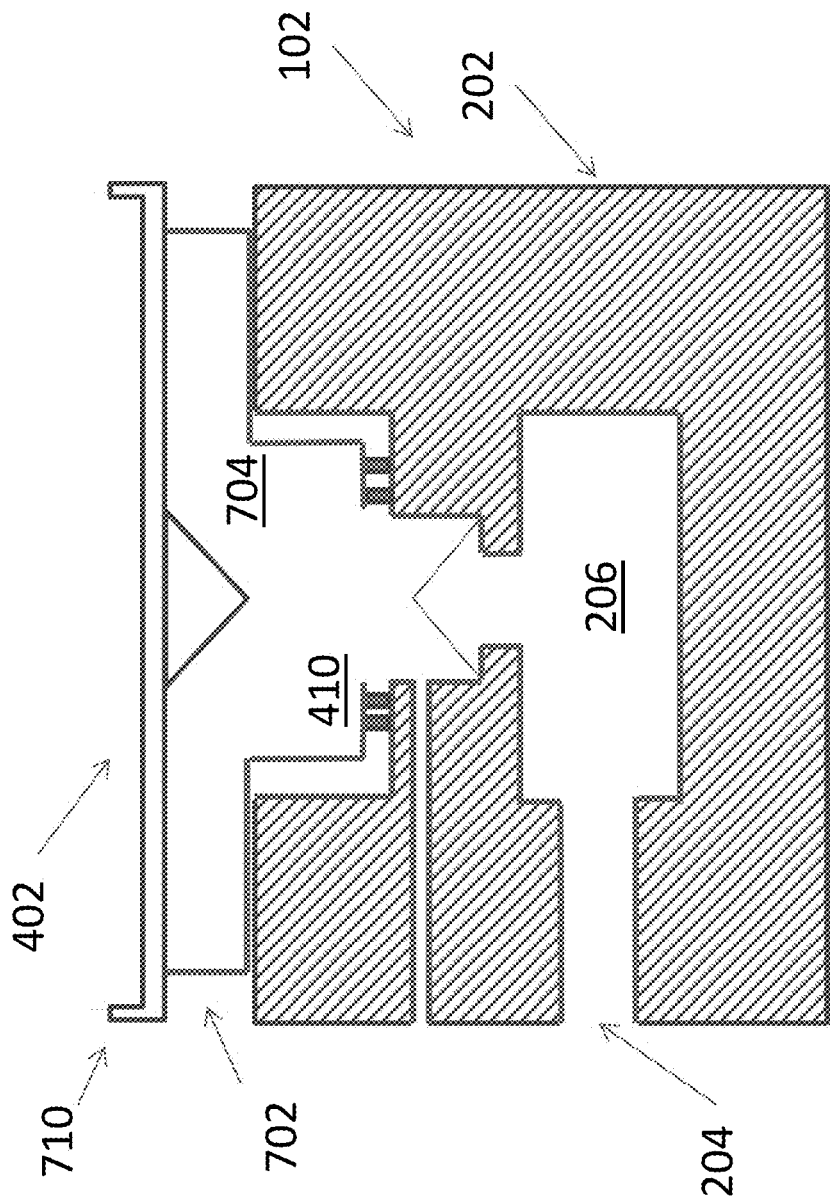
FIG. 7 illustrates a cross section side view of a griddle and stockpot cooker according to another embodiment of the invention.

Referring now to FIG. 7, another embodiment of a griddle 710 has a tiered downward extension 702. The tier creates an upper heating cavity 704, followed by a lower heating cavity 710, as described above. This tiered configuration may allow heat to spread more evenly across the griddle surface 402 at a faster rate due to the lack of potential interference from circular wall 408. The downward extension 702 may extend in any shape up to the boundary of the griddle 710, although it preferably terminates at least some distance away from the outer periphery as a safety measure to prevent accidental contact with this heated surface. In addition and/or the alternative, insulation could be provided around the edges of downward extension 702 to prevent heat loss and/or injury from accidental human contact.

Figure 8:
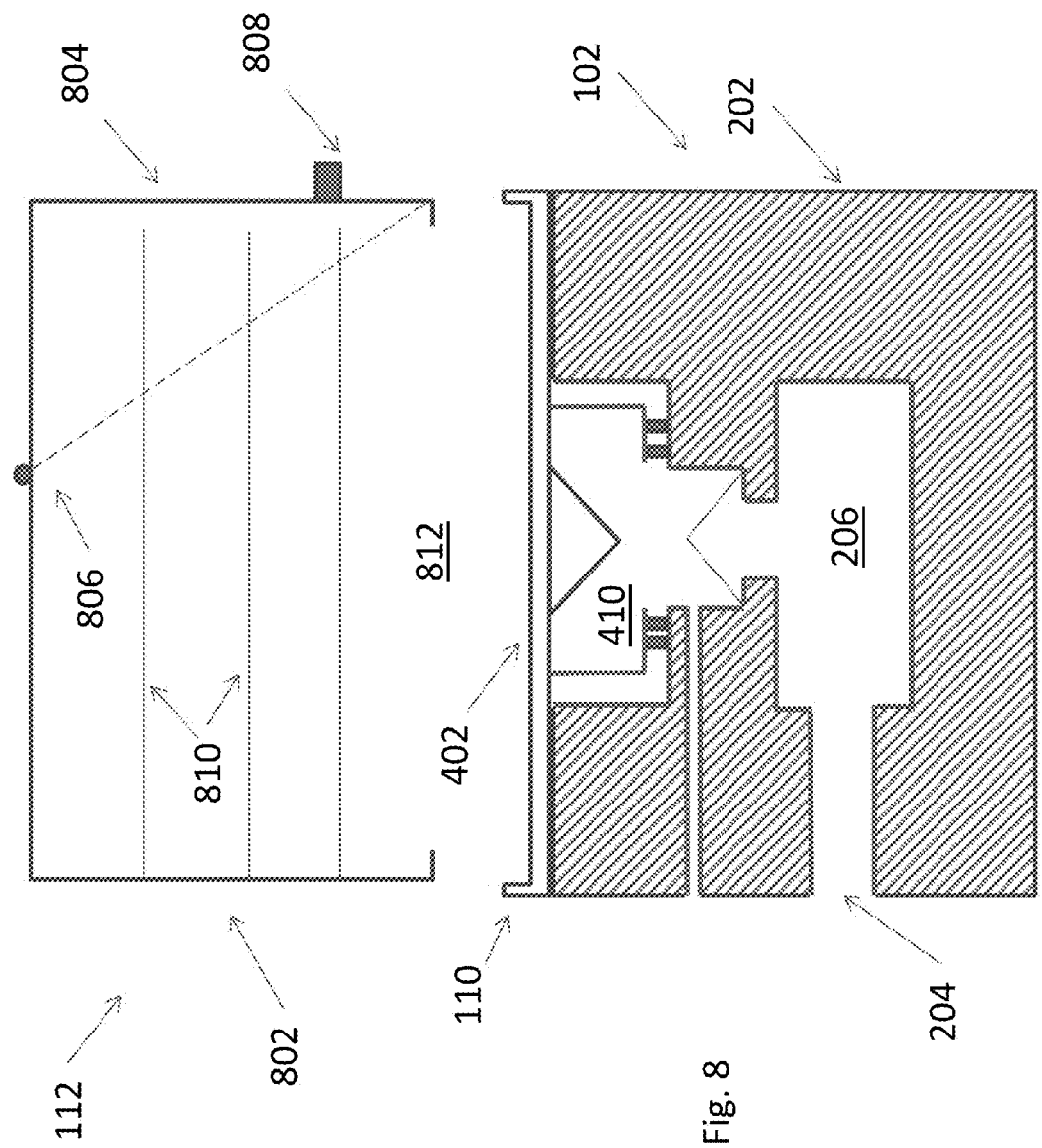
FIGS. 8 and 9 illustrate a cross section side view of an oven and stockpot cooker deployed in an oven configuration according to an embodiment of the invention.
Figure 9:
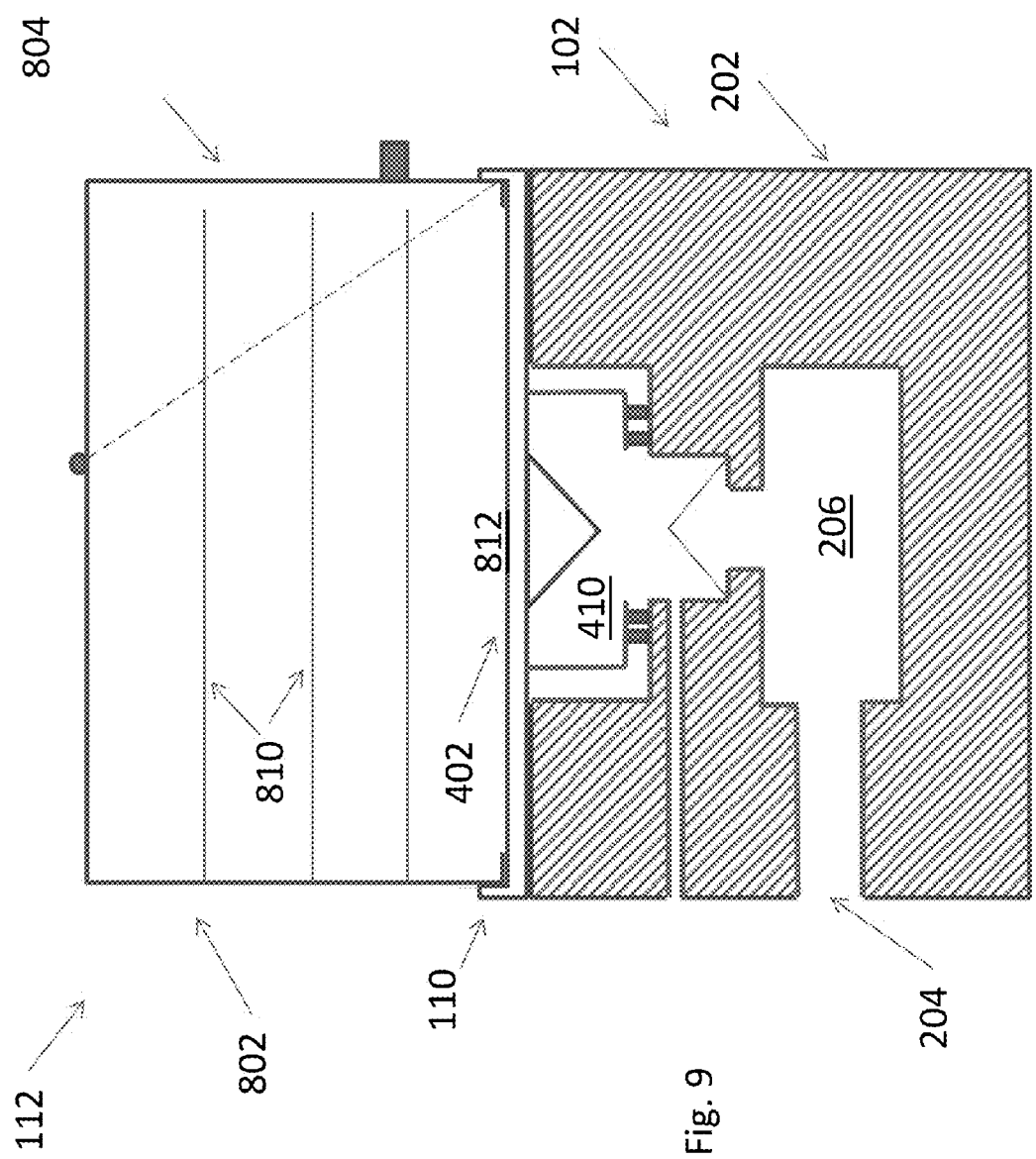

Referring now to FIGS. 8 and 9, an oven 112 may be mounted on griddle 110 to provide oven-based cooking In FIG. 8, oven 112 is a clamshell type with an oven body 802, a front triangular door 804 mounted via a hinge 806, and is rotatable via a handle 808. Racks 810 may be positioned throughout the interior of oven 112 as is known in the art. The bottom 812 of oven body 802 is preferably substantially, if not completely, open to the below area. Preferably at least 95%, and particularly 100%, of the bottom 812 is open. The outer lower dimensions of oven body 802 preferably match the inner dimensions of flanges 404 of griddle 110 to provide a snug and slide free fit. However, this need not be the case, and other mating configurations could be used.

As seen in FIG. 9, when oven 112 is lowered onto griddle 110, griddle surface 402 of griddle 110 becomes the heat source for oven 112, providing heat via both radiation and natural convection. This design shows substantial temperature consistency at different heights within oven body 802 at the different racks 810 of within about 5 degrees, which is not a typical characteristic of most ovens (which can differ by up to 50 degrees).

Figure 10:
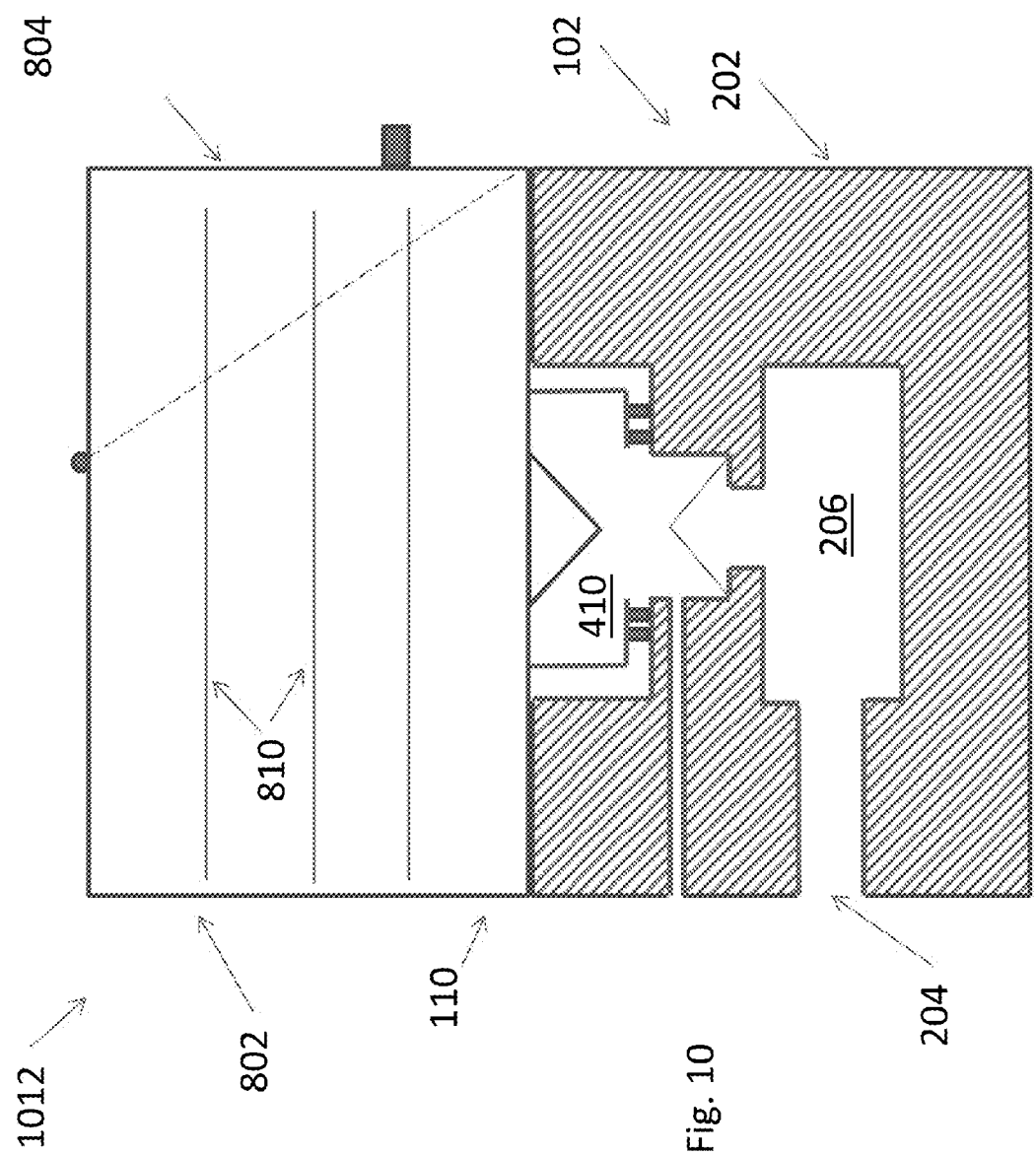
FIG. 10 illustrates a cross section side view of an oven with a stockpot cooker according to another embodiment of the invention.

Referring now to FIG. 10, another embodiment of an oven 1012 is shown. In this embodiment, the bottom of oven 1012 is closed and has a downward projecting deflection mechanism and cylindrical wall consistent with that discussed with respect to griddle 110 above. Oven 1012 can be used without the interface of griddle 110. However, it will be heavier and may require additional personnel to lift into place.

Figure 11:
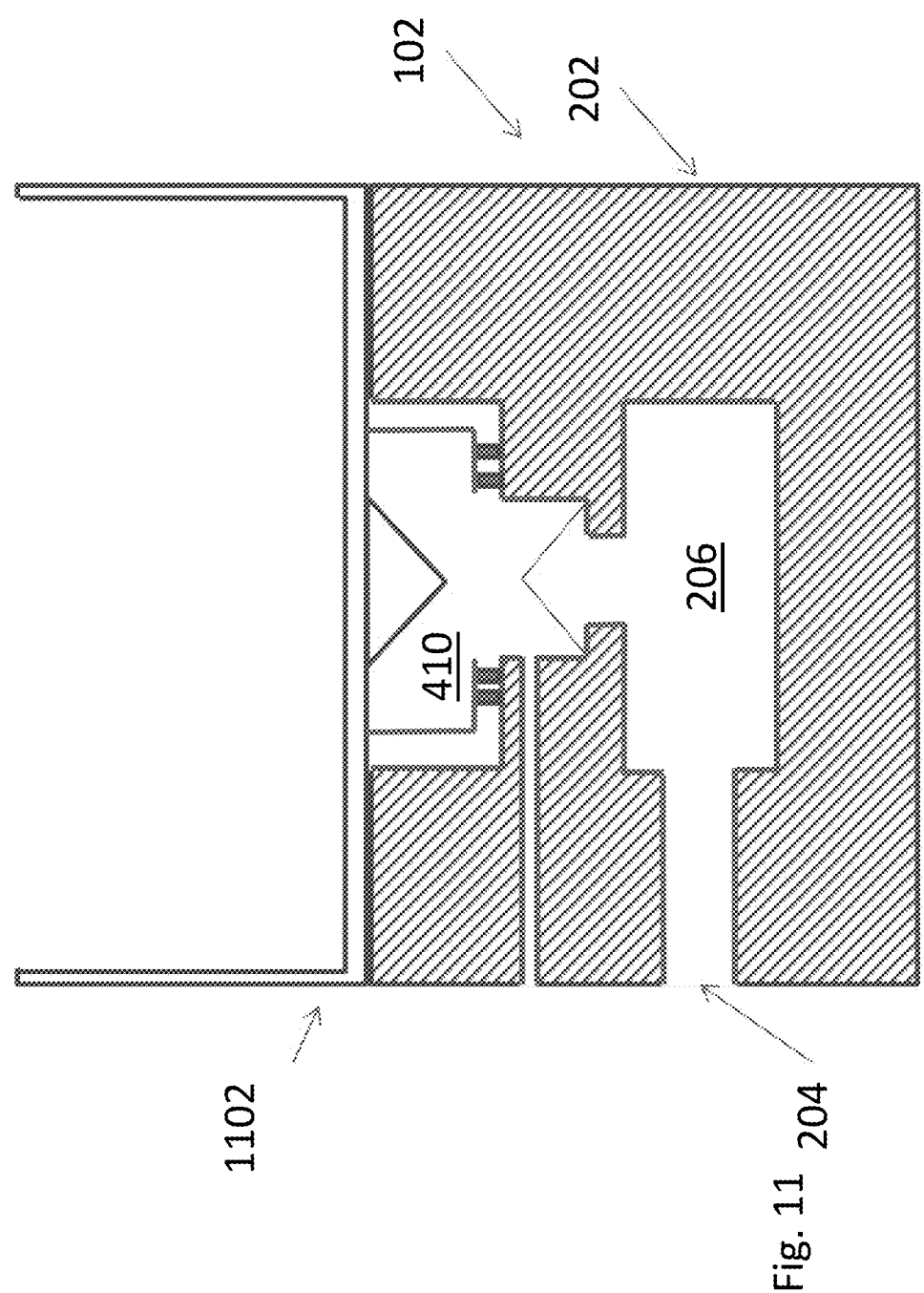
FIG. 11 illustrates a cross section side view of water basin with a stockpot cooker deployed in a water basin configuration according to an embodiment of the invention.

Referring now to FIG. 11, stockpot cooker 102 may support a water basin 1102. Water basin 1102 defines a water receiving area in which water can be heated to wash dishes and the like. The bottom of water basin 1102 has the same general configuration as any of griddles 110, 610 or 710 discussed above; although the invention is not so limited.

Figure 12:
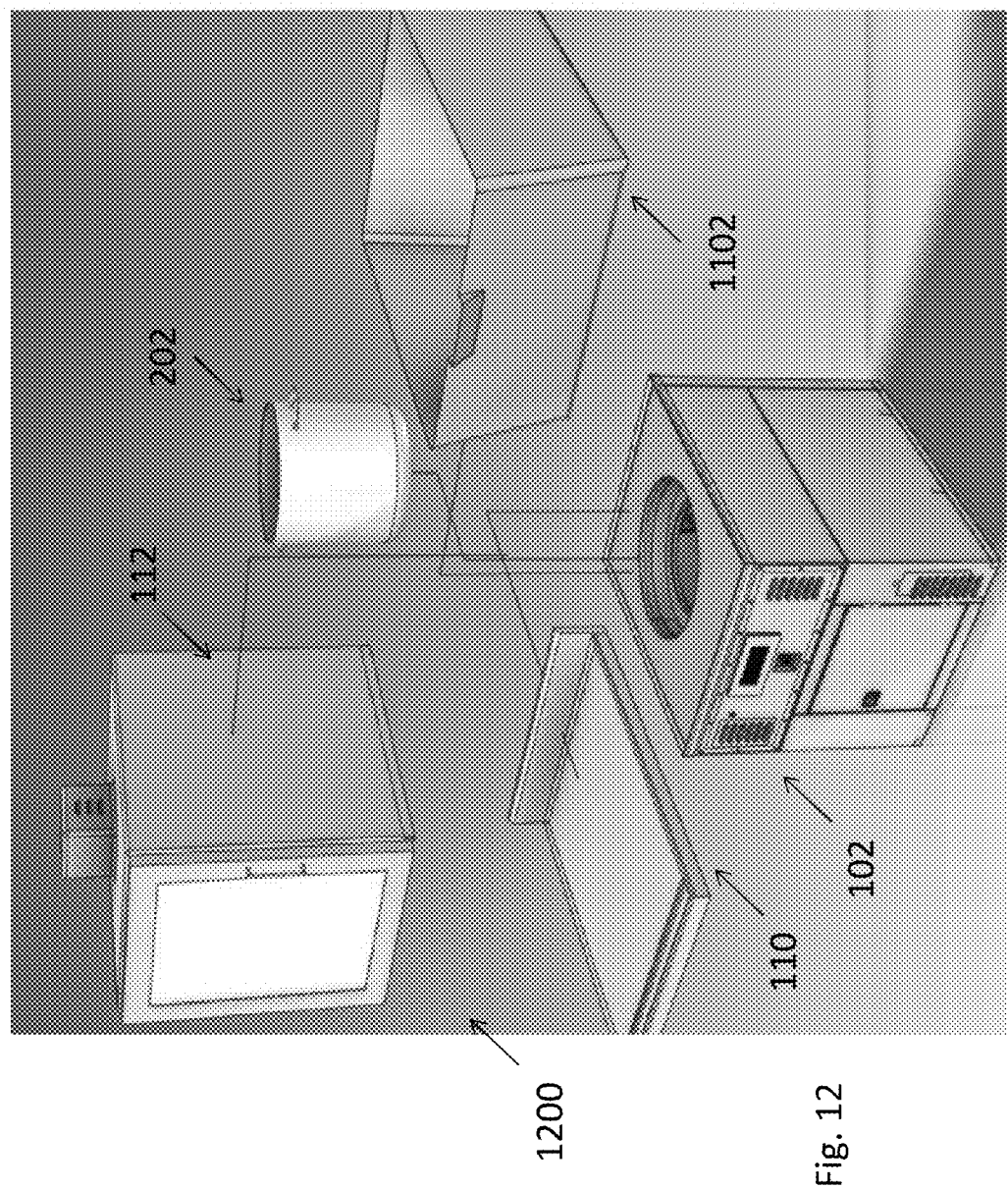
FIG. 12 illustrates a perspective view of another embodiment of a modular cooking apparatus.

Referring now to FIG. 12, another embodiment of a module cooking apparatus is shown. Modular apparatus 1200 may have all of the various components discussed above. Modular apparatus 1200 shows various permissible alternatives relative to modular apparatus 100, including a front door oven, shorter griddle, etc.

Figure 13:
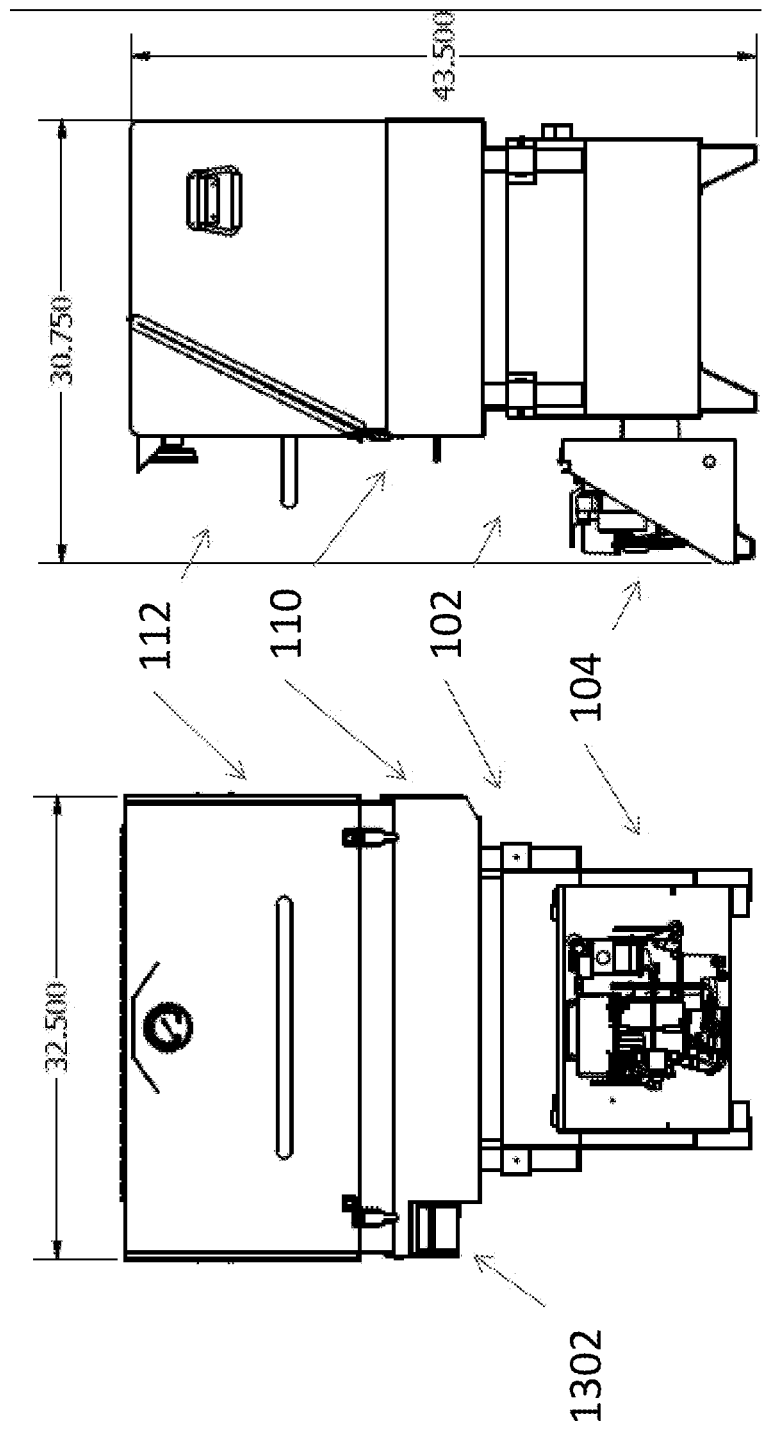
FIGS. 13A and 13B respectively illustrate front and side views of the embodiment of FIG. 1 deployed in an oven configuration.

FIGS. 13A and 13B show exterior views of modular cooking apparatus 100 in FIG. 1 assembled into oven cooking configuration. In this embodiment burner 104 is shown in the front, although as discussed above may be on the side or rear.

As seen in FIGS. 1 and 13A, and as discussed more fully in U.S. Patent Publication 2010/0011971, griddle 110 may include a side grease tray 118 with underlying drawer 1302. Grease and food debris may be scraped off griddle 110 into grease tray 118 and then into the underlying drawer 1302; drawer 1302 can then be withdrawn and the refuse disposed of. As it is not necessary to heat drawer 1302, griddle 110 may not be centered on stockpot cooker 102 so that drawer 1302 may extend further away from the heat source. If oven 112 is configured to the dimensions of the flanges 404 of griddle 110, then oven 112 may also not be centered on the stockpot cooker 102. This may provide an advantage of a cooler cooking region on the side of oven 112 should that be desired for any purpose. However, the invention is not so limited, and the entire apparatus could be centered over stockpot cooker 102.

Figure 14:
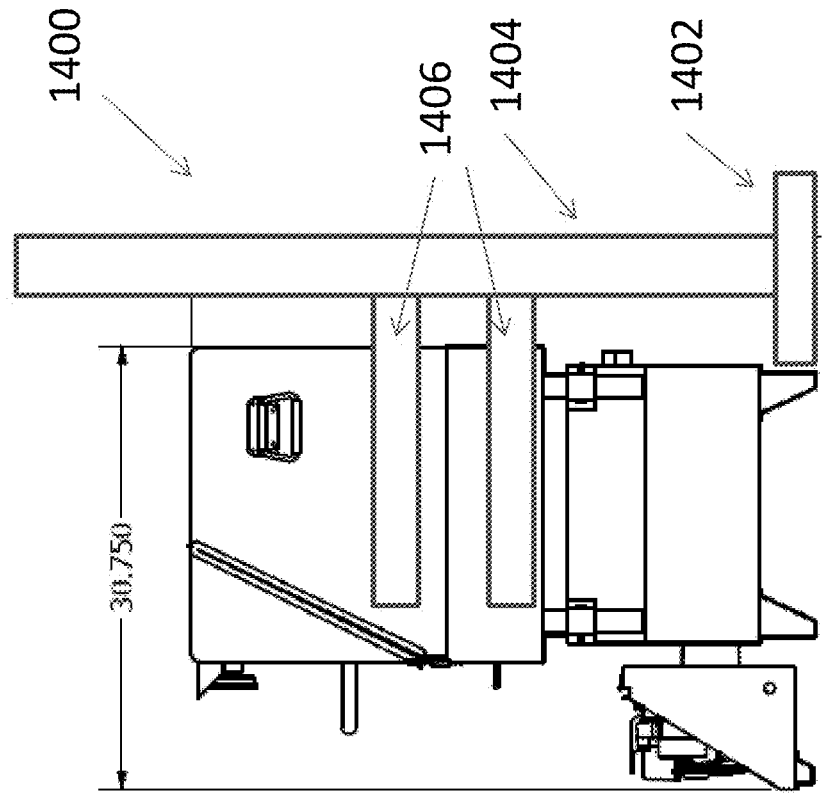
FIG. 14 illustrates a side view of a frame for supporting the various modular components.

In the above embodiments, the various kitchen appliances are physically lifted onto stockpot cooker 102 to change configurations. Referring now to FIG. 14, a frame 1400 may be provided to at least support, and potentially automatically lift and lower, the kitchen components. Frame 1400 has a weighted base 1402 to support an upwardly extending post 1404 with laterally extending arms 1406. Each arm 1406 can support one of the kitchen components, such as for example griddle 110 and/or oven 112.

During assembly, a user could mount these kitchen components onto arms 1406 (using mounting interfaces not shown but within the knowledge and skill of the art, such as a rack mating with extensions on the side of the components) which can support the cooking components vertically above stockpot cooker 102. An automated lifting mechanism (not shown but within the knowledge and skill of the art, such as a pneumatic lift) can lift and lower the various kitchen components into the desired configuration. For example, for stockpot configuration, frame 1402 would lift griddle 110 and oven 112 above stockpot cooker 102, preferably to a height that would not interfere with the chef's ability to access the stockpot cooker 102. For griddle configuration, frame 1400 could lower griddle 110 onto the stockpot cooker 102 while maintaining oven 112 in an upper refracted position. Oven 112 could then be lowered onto griddle 110 to convert the apparatus into an oven configuration as shown in FIG. 14.

The various components described herein or preferably made from appropriate materials as are known in the art, such as stainless steel along with other insulating components. The invention is not limited to any particular type of materials, although as discussed above there is a preference to minimize the weight of each component so that it can be lifted by a single individual.

The above embodiments are exemplary only, and there are a variety of potential alternative designs. By way of non-limiting example, FIGS. 5-7 show various configurations for the underside of griddle 110, and those various configurations could also be used for the underside of oven 1012, water basin 1102, and any other type of cooking appliance mounted thereon. In another non-limiting example, the stockpot cooker recess 210 and the griddle wall 408 are described as cylindrical; however, the invention is not so limited, and other shapes may be used. In yet another non-limiting example, bottom 812 of oven 112 could be closed (or less open) than described above, although this would tend to make oven 112 heavier and/or less efficient.

FIG. 15 shows another embodiment of the invention for griddle use. Griddle 110 may have handles 1502 to facilitate lifting the griddle 110. Pins 1504 may be inserted to secure griddle 110 to stockpot cooker 102.

Figure 16:
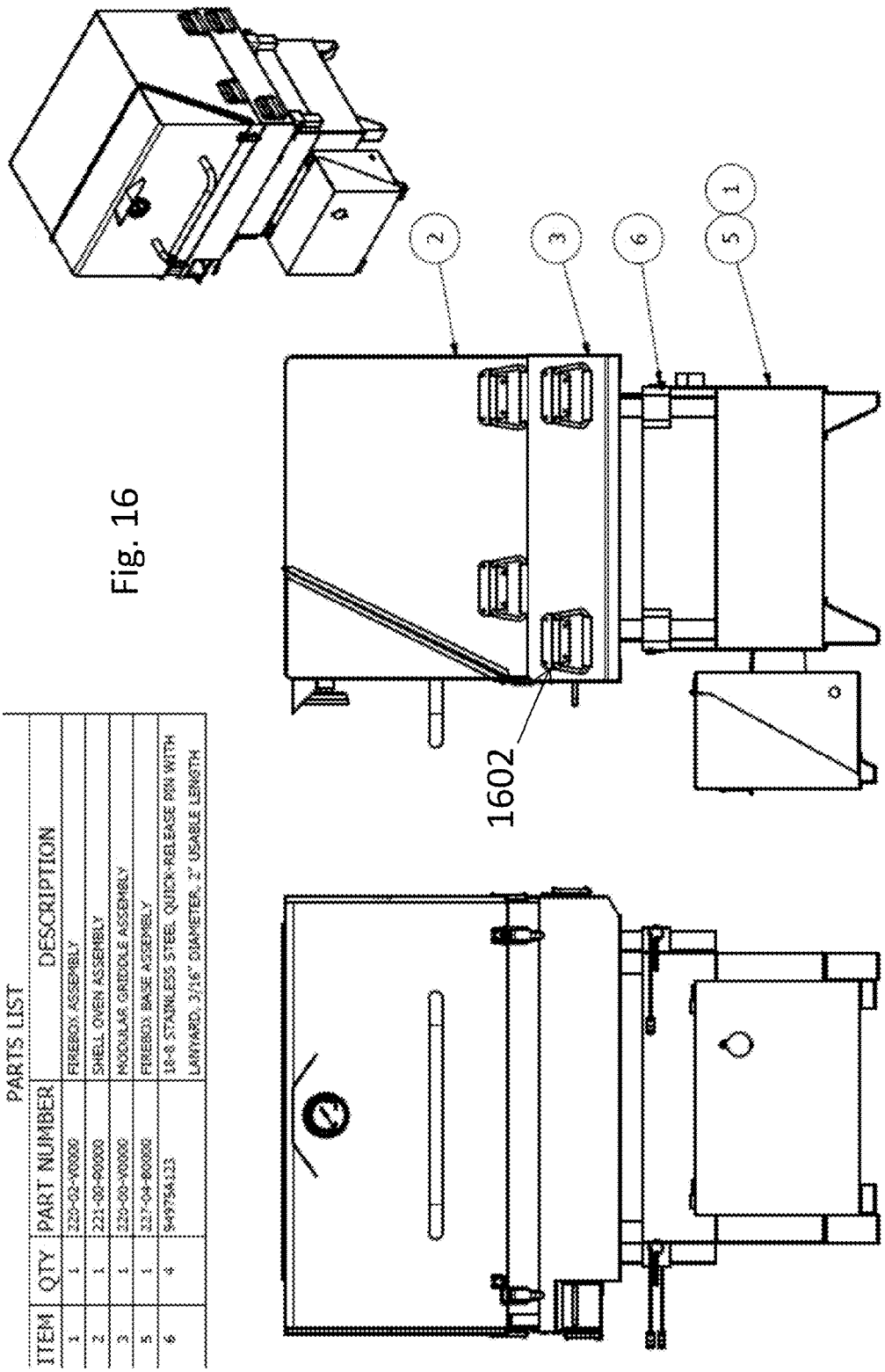
FIG. 16 illustrates another embodiment of an oven configuration.

FIG. 16 shows another embodiment of the invention for oven use. Oven 112 may have handles 1602 to facilitate lifting oven 112.

Figure 17:
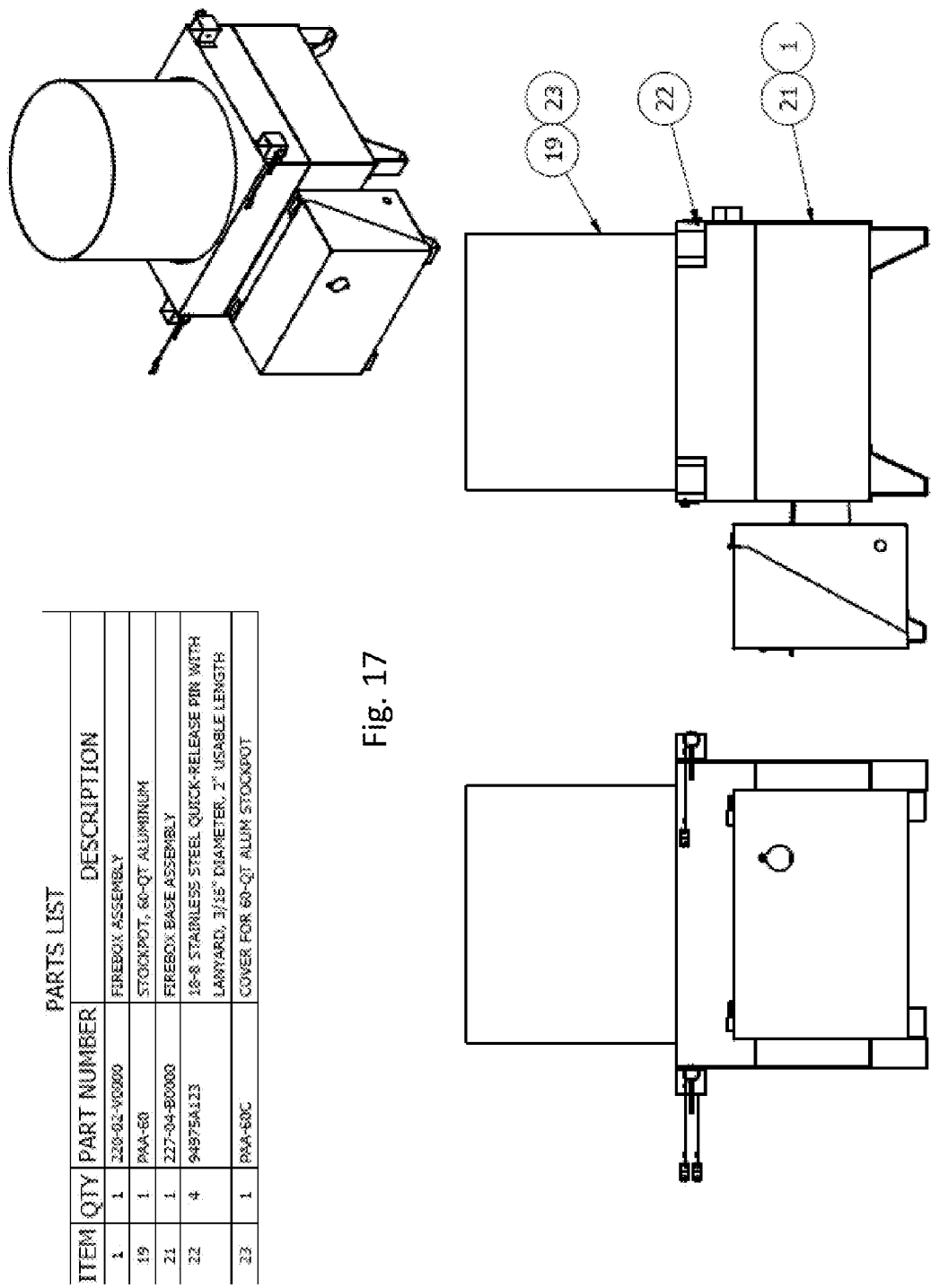
FIG. 17 illustrates another embodiment of a stockpot cooker configuration.

FIG. 17 shows another embodiment of the invention for stockpot use.

Figure 18:
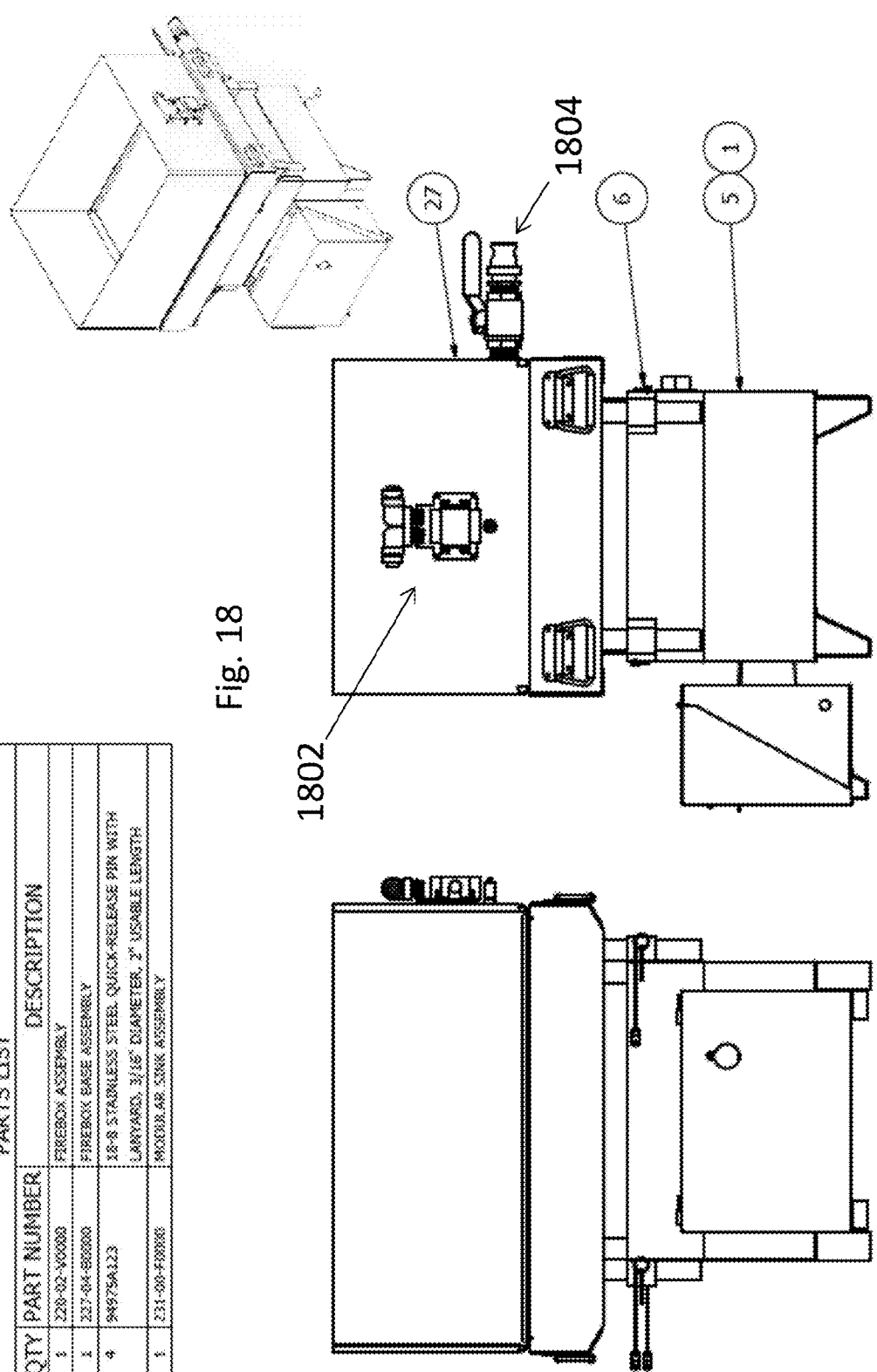
FIG. 18 illustrates another embodiment of a water basin configuration.

FIG. 18 shows another embodiment of the invention for water basin use. Water basin 1102 may have a water sensor 1802 to detect the presence of water in the basin before it is heated. It may also have an outlet 1804 to drain out the water.

The above embodiments provide different kitchen appliances in a compact, portable and lightweight design. Each component can weigh on the order of less than about 100 pounds, which is light enough to be carried by one person. The entire device can easily be assembled and disassembled into its various components by one-two people and the components can be transported in a small trailer or vehicle.

Figure 21:
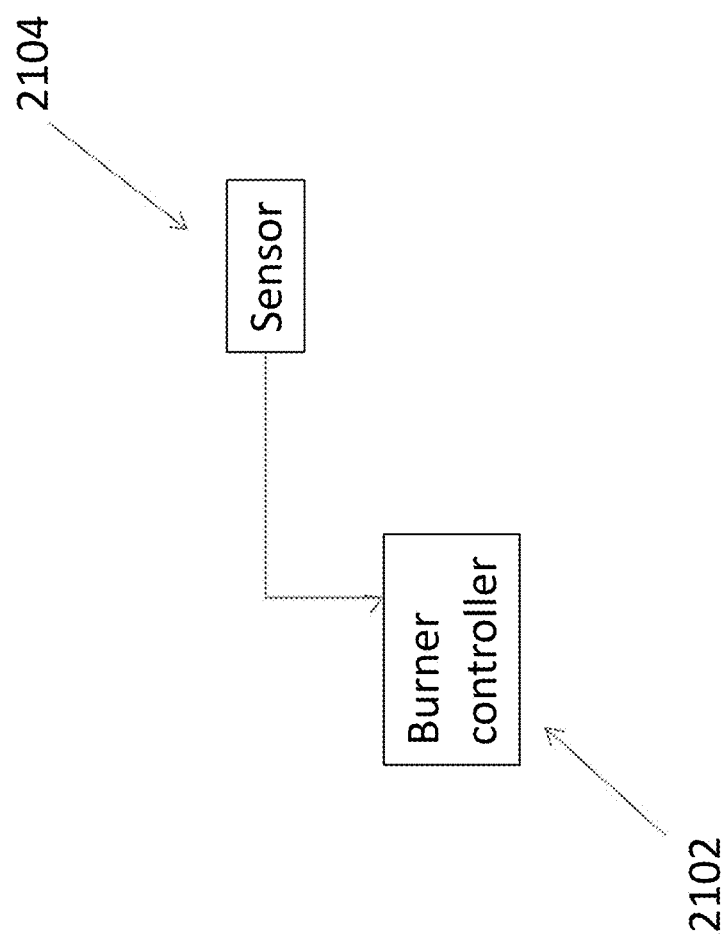
FIG. 21 illustrates a block diagram of a control for the burner.

Referring now to FIG. 21, a burner controller 2102 may be provided to improve or optimize combustion performance of burner 104 relative to operating conditions and/or the particular type of deployed cooking module (griddle 110, oven 112, etc.). Burner controller 2102 may be in part of burner 104 and/or the individual cooking modules and may work independently or coordinate. Various sensors 2102 can provide performance parameters for the controller to consider, such as a temperature sensor and/or an exhaust analyzer placed in or proximate to vent 214 to analyze exhaust and feeding those parameters back to controller 2102.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A modular cooking apparatus, comprising:
a base unit configured to direct heat to a recess, the recess having a ledge therein configured to receive a stockpot;
a griddle having a top griddle cooking surface, and a downward extending wall configured to engage the recess of the base unit;
an oven having a substantially open bottom, and configured to engage the top griddle cooking surface of the griddle, wherein the griddle cooking surface acts as a heat source for the oven;
wherein the base unit individually defines a stockpot cooker configuration;
wherein a combination of the griddle mounted on the base unit defines a griddle configuration;
wherein a combination of the griddle mounted on the base unit and the oven mounted on the griddle defines an oven configuration.

2. The modular cooking apparatus of claim 1, further comprising a water basin having a downwardly extending wall configured to engage the recess of the base unit, wherein a combination of the water basin mounted on the base unit defines a heated sink configuration.

3. The modular cooking apparatus of claim 1, further comprising an upwardly extending ring on the ledge.

4. The module cooking apparatus of claim 3, where in the downwardly extending wall of the griddle has a downwardly extending ring.

5. The modular cooking apparatus of claim 4, wherein when the griddle is mounted on the base unit, the ring of the griddle and the ring on the ledge concentrically overlap to define a lateral heat barrier.

6. The module cooking apparatus of claim 1, further comprising a frame configured to support and vertically move the griddle and the oven above the stockpot cooker to alternate between the stockpot cooker configuration, the griddle configuration, and the oven configuration.

7. The module of claim 1, wherein the downwardly extending wall of the griddle is tiered into a lower section and an upper section of different widths, the lower section being configured to engage the recess of the base unit, and the upper section being wider than the recess.

8. The module of claim 7, wherein when the griddle is mounted on the base unit, the upper section of the downwardly extending wall does not extend as far as any lateral side of the base unit, such that the any lateral side of the base unit acts as a guard against physical contact with the upper section.

9. The module of claim 1, wherein the griddle includes a downward extending mass shaped to divert rising heat from the base unit laterally across the bottom surface of griddle, the mass configured to enter into the recess of the base unit when the griddle is mounted on the base unit.

10. The module of claim 9, wherein the mass is an inverted pyramid.

11. The module of claim 9, further comprising:
the oven being adapted to receive cooking racks at different heights in the oven,
wherein the oven, when installed on the griddle and in the presence of applied cooking heat at the base unit, maintains substantial cooking temperature consistency at the different heights within about 5 degrees.

12. The module of claim 1, further comprising:
the oven being adapted to receive cooking racks at different heights in the oven,
wherein the oven, when installed on the griddle and in the presence of applied cooking heat from the base unit, maintains substantial cooking temperature consistency at the different heights within about 5 degrees.

13. A modular cooking apparatus, comprising:
a base unit configured to direct heat to a recess, the recess having a ledge therein configured to receive a stockpot;
a griddle having a top griddle cooking surface, and a downward extending mass shaped to divert rising heat from the base unit laterally across the bottom surface of griddle, the mass being configured to enter into the recess of the base unit when the griddle is mounted on the base unit;
an oven having a substantially open bottom, and configured to engage the top griddle cooking surface of the griddle, wherein the griddle cooking surface acts as a heat source for the oven;
wherein the base unit individually defines a stockpot cooker configuration;
wherein a combination of the griddle mounted on the base unit defines a griddle configuration;
wherein a combination of the griddle mounted on the base unit and the oven mounted on the griddle defines an oven configuration.

14. The modular cooking apparatus of claim 13, further comprising a water basin having a downwardly extending wall configured to engage the recess of the base unit, wherein a combination of the water basin mounted on the base unit defines a heated sink configuration.

15. The module cooking apparatus of claim 13, further comprising a frame configured to support and vertically move the griddle and the oven above the stockpot cooker to alternate between the stockpot cooker configuration, the griddle configuration, and the oven configuration.

16. The module of claim 13, wherein the griddle includes a downward extending mass shaped to divert rising heat from the base unit laterally across the bottom surface of griddle, the mass configured to enter into the recess of the base unit when the griddle is mounted on the base unit.

17. The module of claim 13, further comprising:
the oven being adapted to receive cooking racks at different heights in the oven,
wherein the oven, when installed on the griddle and in the presence of applied cooking heat from the base unit, maintains substantial cooking temperature consistency at the different heights within about 5 degrees.

18. The module cooking apparatus of claim 16, wherein the mass is an inverted pyramid.

* * * * *